United States Patent
Madhavarapu et al.

(10) Patent No.: US 7,616,647 B1
(45) Date of Patent: Nov. 10, 2009

(54) METHOD AND SYSTEM FOR WIRELESS LOCAL NUMBER PORTABILITY

(75) Inventors: Gangadharam Madhavarapu, Overland Park, KS (US); Correy Trupp, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1340 days.

(21) Appl. No.: 10/386,316

(22) Filed: Mar. 11, 2003

(51) Int. Cl.
*H04L 12/28* (2006.01)

(52) U.S. Cl. .................. 370/401; 370/352; 370/353; 370/354; 455/410; 455/411

(58) Field of Classification Search .............. 370/352, 370/410, 395.31, 466, 338, 349, 401
See application file for complete search history.

(56) References Cited

U.S. PATENT DOCUMENTS

| | | | |
|---|---|---|---|
| 5,964,891 A | 10/1999 | Caswell et al. | |
| 6,021,126 A * | 2/2000 | White et al. | 370/352 |
| 6,085,222 A | 7/2000 | Fujino et al. | |
| 6,119,160 A | 9/2000 | Zhang et al. | |
| 6,151,628 A | 11/2000 | Xu et al. | |
| 6,161,008 A | 12/2000 | Lee et al. | |
| 6,272,129 B1 | 8/2001 | Dynarski et al. | |
| 6,298,383 B1 | 10/2001 | Gutman et al. | |
| 6,308,267 B1 | 10/2001 | Gremmelmaier | |
| 6,389,008 B1 | 5/2002 | Lupien et al. | |
| 6,404,754 B1 | 6/2002 | Lim | |
| 6,427,170 B1 | 7/2002 | Sitaraman et al. | |
| 6,438,223 B1 * | 8/2002 | Eskafi et al. | 379/221.13 |
| 6,445,922 B1 | 9/2002 | Hiller et al. | |
| 6,460,081 B1 | 10/2002 | Doherty et al. | |
| 6,463,055 B1 | 10/2002 | Lupien et al. | |
| 6,466,571 B1 | 10/2002 | Dynarski et al. | |
| 6,469,998 B1 | 10/2002 | Burgaleta et al. | |
| 6,473,609 B1 | 10/2002 | Schwartz et al. | |
| 6,483,822 B1 | 11/2002 | Lioy et al. | |
| 6,553,022 B2 | 4/2003 | Hartmaier | |
| 6,639,912 B1 * | 10/2003 | Christie et al. | 370/352 |

(Continued)

FOREIGN PATENT DOCUMENTS

EP    1 248 484 A1    10/2002

(Continued)

OTHER PUBLICATIONS

North American Numbering Council, Wireless Number Portability Subcommittee, "Report on Wireless Number Portability, Technical, Operational and Implementation Requirements Phase II", Oct. 6, 2000.

(Continued)

*Primary Examiner*—Vincent P Harper
*Assistant Examiner*—Mazda Sabouri (57) ABSTRACT

A mobile station is identified by a mobile directory number (MDN) and by a mobile station identifier (MSID). To communicate with a packet-switched network, the mobile station transmits its MSID, and a network access server, such as an interworking function (IWF), assigns an IP address to the mobile station and correlates the IP address with the MSID. A gateway receives a communication from the mobile station that includes the mobile station's IP address. The gateway identifies the mobile station's MDN based, at least in part, on the IP address, a correlation between IP address and MSID, and a correlation between MSID and MDN.

27 Claims, 3 Drawing Sheets

U.S. PATENT DOCUMENTS

| | | |
|---|---|---|
| 6,658,095 B1 | 12/2003 | Yoakum et al. |
| 6,678,265 B1 * | 1/2004 | Kung et al. ............... 370/352 |
| 6,834,300 B1 | 12/2004 | Barna et al. |
| 6,944,150 B1 | 9/2005 | McConnell et al. |
| 6,977,917 B2 * | 12/2005 | Skog et al. ............... 370/349 |
| 6,985,479 B2 | 1/2006 | Leung et al. |
| 7,065,067 B2 | 6/2006 | Song et al. |
| 7,123,594 B2 | 10/2006 | Yang |
| 7,136,372 B1 | 11/2006 | Nilsen |
| 7,165,122 B1 | 1/2007 | Sitaraman et al. |
| 7,305,429 B2 | 12/2007 | Borella |
| 2001/0028636 A1 | 10/2001 | Skog et al. |
| 2001/0034224 A1 | 10/2001 | McDowell et al. |
| 2002/0035605 A1 | 3/2002 | McDowell et al. |
| 2002/0077897 A1 * | 6/2002 | Zellner et al. ............... 705/14 |
| 2002/0086672 A1 | 7/2002 | McDowell et al. |
| 2002/0116338 A1 | 8/2002 | Gonthier et al. |
| 2002/0126701 A1 | 9/2002 | Requena |
| 2002/0186696 A1 | 12/2002 | Lim |
| 2002/0187781 A1 | 12/2002 | Furlong |
| 2003/0018704 A1 | 1/2003 | Polychronidis et al. |
| 2003/0028621 A1 | 2/2003 | Furlong et al. |
| 2003/0046400 A1 | 3/2003 | Friel et al. |
| 2003/0048195 A1 | 3/2003 | Trossen |
| 2003/0154293 A1 | 8/2003 | Zmolek |
| 2004/0003046 A1 | 1/2004 | Grabelsky et al. |
| 2004/0009761 A1 | 1/2004 | Money et al. |
| 2004/0098310 A1 * | 5/2004 | Engelhart ............... 705/26 |
| 2004/0141500 A1 | 7/2004 | Pavlak et al. |
| 2004/0176128 A1 | 9/2004 | Grabelsky et al. |
| 2004/0260816 A1 * | 12/2004 | Skog et al. ............... 709/227 |
| 2005/0085218 A1 * | 4/2005 | Clayton ............... 455/411 |
| 2005/0096048 A1 | 5/2005 | Clare et al. |
| 2005/0119000 A1 | 6/2005 | Nasielski et al. |
| 2005/0233776 A1 | 10/2005 | Allen et al. |
| 2006/0019708 A1 | 1/2006 | Raman et al. |
| 2006/0133341 A1 | 6/2006 | Chari et al. |
| 2006/0149814 A1 | 7/2006 | Borella |
| 2006/0209768 A1 | 9/2006 | Yan et al. |
| 2007/0124472 A1 | 5/2007 | Requena |

FOREIGN PATENT DOCUMENTS

| | | |
|---|---|---|
| EP | 1 251 671 A2 | 10/2002 |
| WO | WO 00/04689 A1 | 1/2000 |

OTHER PUBLICATIONS

Office Action, mailed Jan. 22, 2009, in U.S. Appl. No. 10/832,922.

* cited by examiner

METHOD AND SYSTEM FOR WIRELESS LOCAL NUMBER PORTABILITY

BACKGROUND

1. Field of the Invention

The present invention relates to telecommunications and, more particularly, to methods and systems for identifying mobile stations in communication with a packet-switched network.

2. Description of Related Art

In wireless telecommunications networks in North America, each mobile station has been traditionally identified by a unique 10-digit mobile identification number (MIN). The MIN typically served two identification functions. First, the MIN served as a device identifier that uniquely identified the mobile station itself. For example, wireless telecommunications networks would use the MIN transmitted by a mobile station, often in combination with an electronic serial number (ESN) and other information, to authenticate the mobile station for access to radio resources (e.g., when the mobile station attempted to originate a call) and/or other resources. Wireless networks also used MINs for mobility management. For example, wireless networks located mobile stations (e.g., to alert them of incoming telephone calls or to send SMS messages to them) based on their MINs stored in home location registers (HLRs) and visitor location registers (VLRs).

Second, the MIN corresponded to the directory number of the mobile station, i.e., to the telephone number that could be dialed to call the mobile station. Thus, from the perspective of other users, the MIN served to identify a user, not just a device. In many cases, wireless telecommunications networks also identified users by MIN. For example, wireless networks often maintained for each user a subscriber profile, keyed by MIN, that identified what services the user subscribed to. Thus, in order to determine what services a mobile station user was authorized for, wireless telecommunications networks would often use the MIN transmitted by the mobile station to retrieve the subscriber profile for that user. In addition, wireless networks often identified users by MIN for billing purposes.

MINs often had a degree of portability. In many cases, a MIN could be assigned to different devices at different times. Thus, a user could buy a new mobile station and be able to use the same MIN (and, thus, the same directory number) as before, at least if the user stayed with the same wireless service provider. However, if the user switched to a different wireless service provider, then the user would often have to switch to a new MIN and, thus, switch to a new directory number, as well. This is because MINs were traditionally allocated in blocks to particular wireless service providers.

However, the FCC has recently required wireless service providers to implement wireless local number portability (WLNP). In accordance with this FCC mandate, a user will be able to keep the same directory number when switching wireless service providers. To achieve this requirement, wireless telecommunications networks may use two identifiers, such as a mobile station identifier (MSID) and a mobile directory number (MDN), to identify each mobile station, instead of a single MIN. The MSID is a device identifier, and it need not be portable. The MDN corresponds to the directory number of the mobile station, i.e., to the telephone number that can be dialed in order to call the mobile station.

Initially, the MSID and MDN may be the same for a given mobile station. However, if the user switches wireless service providers, then the MSID and MDN for the user's mobile station may become different. Specifically, the user may keep the same MDN (because of WLNP requirements) but may be assigned a new MSID by the user's new wireless service provider because different wireless service providers may have access to different blocks of MSIDs. In this way, it may be possible for the identical number to be used as (1) an MSID for one mobile station and (2) as an MDN for another mobile station. It may also be possible for a user to have access to several mobile stations, each having the same MDN but different MSIDs. Similarly, it may be possible that different MDNs, which may correspond to different users, could be used with the same mobile station identified by a single MSID.

The possibility that a mobile station may have an MDN and MSID that are different can create difficulties. Specifically, there may be an issue regarding whether a mobile station should identify itself by MDN or MSID (or both) in a particular communication, and there may be an issue regarding which identifier a given mobile station is actually using in a particular communication. For example, while it is conventional for a mobile station to transmit its MSID to gain access to radio resources, e.g., a wireless traffic channel, access to other resources or services may be based on MDN. For example, subscriber profiles in wireless telecommunications networks may be keyed to MDNs, as the identifier more directly tied to users. In such cases, the wireless network would need the mobile station's MDN in order to determine what services the mobile station user is authorized to use. However, different mobile stations may transmit different identifiers when seeking access to a given service, i.e., some mobile station may be configured to transmit MDN while other mobile stations may be configured to transmit MSID. Still other mobile stations may be configured transmit a MIN, without being configured to recognize the potential distinction between MDN and MSID. As a result, wireless telecommunications networks may not be able to anticipate whether a given mobile station will transmit an MDN or a MSID when seeking access to a given service. Moreover, when the network receives an identifier from a mobile station, the network might be unable to determine whether the identifier is an MDN or an MSID, because MDNs and MSIDs can be identical. Accordingly, there is a need for wireless telecommunications networks to be able to identify the source (e.g., the particular mobile station or the particular user of the mobile station) of mobile station communications, despite the potential ambiguities created by WLNP requirements.

SUMMARY

In a first principal aspect, an exemplary embodiment of the present invention provides a method of identification for communication between a mobile station and a packet-switched network. The packet-switched network includes a gateway. The mobile station has a first identifier and a second identifier. In accordance with the method, the gateway is provided with a first correlation between the first identifier and the second identifier. A network address is assigned to the mobile station. The gateway is provided with a second correlation between the network address and the first identifier. The gateway receives a message from the mobile station that includes the network address. The gateway identifies a source of the message based, at least in part, on the network address and the first and second correlations.

In a second principal aspect, an exemplary embodiment of the present invention provides a method of identifying a mobile station that has a first identifier and a second identifier. In accordance with the method, a third identifier is assigned to the mobile station. At least one correlation is provided between the first, second, and third identifiers. A message that includes the third identifier is received. The mobile station is identified as being associated with the message based, at least in part, on the third identifier and the correlation.

In a third principal aspect, an exemplary embodiment of the present invention provides a system comprising a network access server and a gateway. The network access server provides a mobile station access to a network. The mobile station has a first identifier and a second identifier. The network access server obtains the first identifier from the mobile station, assigns a network address to the mobile station, and establishes a first correlation between the first identifier and the network address. The gateway obtains the first correlation established by the network access server and has access to a second correlation between the first identifier and the second identifier. The gateway uses the first and second correlations to identify a source of at least one communication related to the mobile station.

DETAILED DESCRIPTION OF EXEMPLARY EMBODIMENTS

The present invention, in exemplary embodiments, overcomes potential ambiguities between MDN and MSID by assigning the mobile station a third identifier that the mobile station uses in communications and by providing a correlation between MDN, MSID, and this third identifier. For example, when a mobile station tries to set up a communication session with a packet-switched network, the mobile station may transmit its MSID. If the MSID is valid, a network access server, such as an interworking function (IWF), may dynamically assign the mobile station a network address, such as an IP address. In this way, the mobile station is associated with a third identifier, its IP address, and a correlation is established between the mobile station's IP address and its MSID. Moreover, this correlation may be communicated to another network element or elements in the packet-switched network that may receive communications from the mobile station.

As a result of this correlation between IP address and MSID, a network element may, for example, identify the source of a mobile station communication (e.g., identify the mobile station itself and/or the user of the mobile station), even though the communication may not include an MDN or MSID. In particular, the network element can obtain the mobile station's IP address from the communication and determine the mobile station's MSID based on the correlation between IP address and MSID that is established by the network access server. Moreover, if the network element is also provisioned with a correlation between MSID and MDN, which may be done in advance, then the network element can also determine the mobile station's MDN.

In this way, the network element may recognize which MSID and MDN corresponds to a given network address included in a communication. The network element may further use the MSID and/or MDN for purposes of identification, e.g., to identify a source of the communication, a destination of the communication, or a mobile station associated with the communication. The network element may also validate the communication based on the correlation between MSID, MDN, and network address. For example, if the communication is requesting a particular service, e.g., requesting content from a specified resource, then the network element could determine from the subscriber profile for that MDN whether the user is authorized for that service.

1. EXEMPLARY ARCHITECTURE

Figure 1:
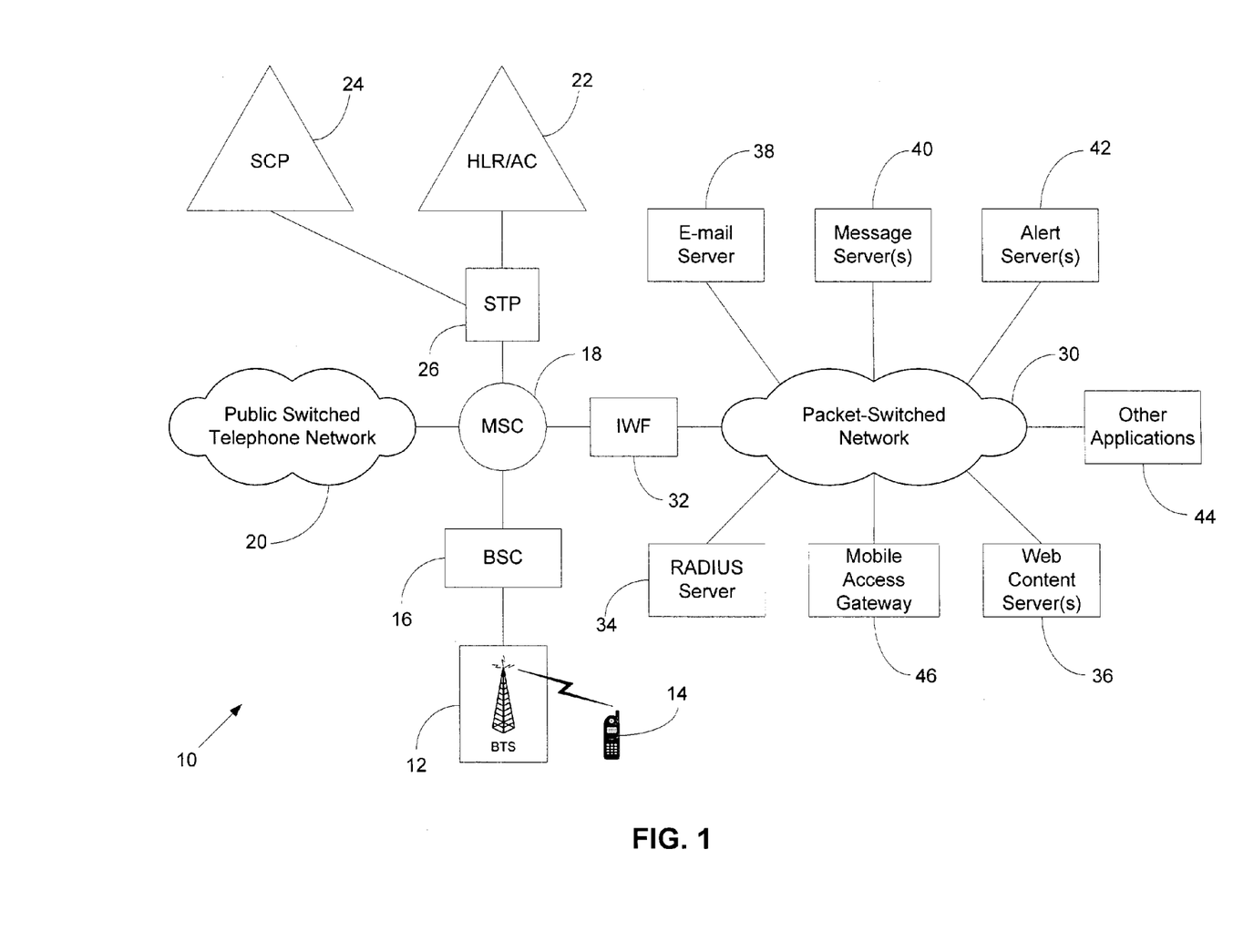
FIG. 1 is a simplified block diagram of a wireless telecommunications network, in accordance with an exemplary embodiment of the present invention.

Referring to the drawings, FIG. 1 is a simplified block diagram of an exemplary wireless telecommunications network 10, in which exemplary embodiments of the present invention may be employed. Wireless telecommunications network 10 includes a base transceiver station (BTS) 12 that provides a wireless coverage area within which BTS 12 may communicate with one or more mobile stations, such as mobile station 14, over an air interface. Mobile station 14 may be a wireless telephone, a wirelessly-equipped personal digital assistant (PDA), or other wireless communication device. The communications between BTS 12 and mobile station 14 may occur in a digital format, such as CDMA, TDMA, GSM, or 802.11x, or they may occur in an analog format, such as AMPS. A preferred wireless communications format is "CDMA 2000," such as described in EIA/TIA/IS-2000 Series, Rev. A (published March 2000), which is incorporated herein by reference.

BTS 12 is controlled by a base station controller (BSC) 16, which, in turn, is controlled by a mobile switching center (MSC) 18. MSC 18 is connected to the public switched telephone network (PSTN) 20 and may use an out-of-band signaling system, such as Signaling System 7 (SS7) to route calls through PSTN 20. MSC 18 is also able to signal to a home location register (HLR) 22 and to a service control point (SCP) 24. This signaling may occur via one or more signal transfer points (STPs), such as STP 26. The signaling between MSC 18 and HLR 22 may conform to IS-41 specifications. A recent revision of the IS-41 specifications, ANSI/TIA/EIA-41-D-97, published in December 1997, is incorporated herein by reference. The signaling between MSC 18 and SCP 24 may conform to the specification "Wireless Intelligent Network," TIA/EIA/IS-771, published in July 1999, which is incorporated herein by reference. Other signaling protocols could be used, however. In this way, MSC 18, BSC 16, and BTS 12 may connect incoming calls from PSTN 20, which calls may originate from calling parties using landline telephones, mobile stations, or other communication devices, to mobile station 14. Similarly, MSC 18, BSC 16, and BTS 12 may connect calls originating from mobile station 14 to their destinations, via PSTN 20.

As shown in FIG. 1, HLR 22 may include an Authentication Center (AC) for authenticating requests from mobile stations, such as mobile station 14, to access radio resources (e.g., wireless traffic channels). Alternatively, the AC may be a network element separate from HLR 22. The process of authenticating requests to access radio resources may, for example, conform to IS-41 specifications. Thus, to request radio resources, the mobile station may transmit a certain authentication result along with its MSID. The AC generates its own authentication result and compares it with the authentication result generated by the mobile station. If the authentication results match, the AC authorizes the mobile station's access to radio resources.

Mobile station 14 is also able to access a packet-switched network 30. Packet-switched network 30 may include one or more local area networks (LANs) and/or one or more wide area network (WANs), such as the Internet. Packet-switched network 30 may route packets using a network protocol, such as the Internet Protocol (IP). Each device in communication with packet-switched network 30 may be identified by a network address, such as an IP address, and each packet carried in packet-switched network 30 may include a source network address and a destination network address, which may be IP addresses.

To provide mobile stations, such as mobile station 14, with access to packet-switched network 30, network 10 may include one or more network access servers. A network access server may, for example, be an interworking function, such as IWF 32, shown connected to MSC 18 in FIG. 1. Alternatively, a network access server may be a packet data serving node (PDSN), e.g., connected to a BSC, or other device that provides access to packet-switched network 30. IWF 32, or other network access server, may also dynamically assign a network address (i.e., temporarily assign a network address from a pool of available network addresses), such as an IP address, to the mobile station. Alternatively, another network element, such as a home agent, may dynamically assign network addresses to mobile stations. In other cases, the mobile station may be assigned a permanent IP address, and the mobile station may, for example, transmit its permanent IP address with its MSID.

IWF 32, or other network access server, may also communicate with other network elements connected to packet-switched network 30 to perform such functions as authentication, authorization, and/or accounting. Such communications may conform to the RADIUS protocols specified in "Remote Authentication Dial In User Service (RADIUS)," Request For Comments 2865 (June 2000) and "RADIUS Accounting," Request For Comments 2866 (June 2000), which are incorporated herein by reference. Other protocols could be used, however. Thus, IWF 32 may communicate with a server, such as RADIUS server 34, connected to packet-switched network 30. RADIUS server 34 may function as an authentication, authorization, and accounting (AAA) server, or RADIUS server 34 may perform a subset of these functions, such as accounting and/or authentication. In an exemplary embodiment, RADIUS server 34 functions as at least an accounting server, and IWF 32 transmits RADIUS accounting START and STOP messages to RADIUS server 34, when IWF 32 starts or stops transmitting data to a mobile station, such as mobile station 14.

Once a mobile station, such as mobile station 14, has access to packet-switched network 30, the mobile station may be able to access one or more packet-based services. For example, the mobile station may be able to engage in wireless Web browsing with one or more Web content server(s) 36. The mobile station may also be able to send and receive e-mail messages, via an e-mail server 38. The mobile station may also be able to send and receive other types of messages, such as short message service (SMS) messages and/or instant messages (IMs), via one or more message server(s) 40. While connected to packet-switched network 30, the mobile station may also be able to receive system-wide alerts, which may be broadcast by one or more alert server(s) 42. The mobile station may also be able to access other applications 44, via packet-switched network, which may include on-line customer service, downloadable ringers, downloadable games, and/or other services.

In an exemplary embodiment, some or all of a mobile station's communications with packet-switched network 30 may occur through a gateway, which may be referred to as a mobile access gateway (MAG) 46. For example, a mobile station may access Web content server(s) 36, e-mail server 38, message server(s) 40, and other applications 44 through MAG 46. When MAG 46 receives a communication from a mobile station requesting access to such packet-based services, MAG 46 may identify the source of the communication, attempt to validate the access request, and, if valid, grant the requested access, as described in more detail below.

To validate requests for access to packet-based services, or other communications, MAG 46 may have access to a plurality of subscriber profiles, keyed to MDN, indicating what services are authorized for each MDN. MAG 46 may also have access to a correlation between MSIDs and MDNs, so that MAG 46 can determine what MDN corresponds to a given MSID. As described in more detail below, another network element, such as IWF 32, may establish a correlation between MSID and IP address and may communicate this correlation to MAG 46. Then, when MAG 46 receives a communication that includes the mobile station's IP address, the MAG will be able to determine the MSID and MDN from the IP address, regardless of whether the communication includes the mobile station's MSID, MDN, or neither of these two identifiers.

In addition, communications from network elements, such as Web content server(s) 36, e-mail server 38, message server (s) 40, alert server(s) 42, and other applications 44 may go through MAG 46 in order to reach the mobile station. For example, MAG 46 may serve as a proxy server for communications between mobile stations and Web content servers. In particular, because of the relatively limited capabilities of many mobile stations, Web browsers on mobile stations often require Web content to be written in specialized markup languages, such as the Wireless Markup Language (WML) or the Handheld Device Markup Language (HDML). However, most Web content is currently written in the HyperText Markup Language (HTML). In addition, such Web browsers may communicate using specialized protocols, such as the Wireless Application Protocol (WAP) or the Handheld Device Transport Protocol (HDTP). As a proxy server, MAG 46 may intermediate communications between mobile stations and Web content servers, e.g., translating content and protocols. MAG 46 may also store "cookies" and may tailor the content it sends to mobile stations based on the preferences of particular users. MAG 46 may also perform additional functions, such as transaction logging and session caching.

2. EXEMPLARY OPERATION

Figure 2:
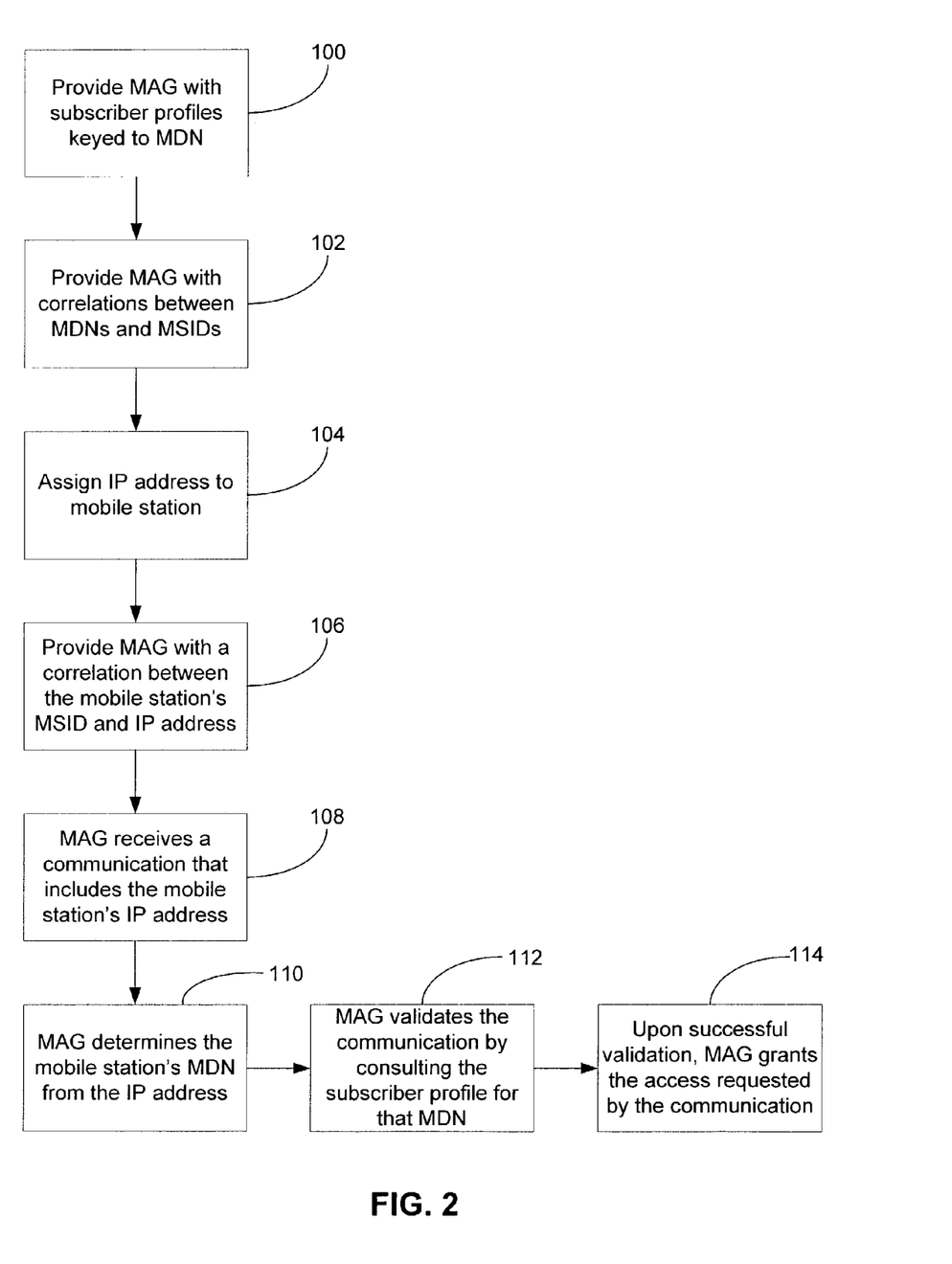
FIG. 2 is a flow chart illustrating a method of operation of the wireless telecommunications network of FIG. 1, in accordance with an exemplary embodiment of the present invention.

The flow chart of FIG. 2 illustrates an exemplary method of operation for wireless telecommunications network 10. The process may begin with providing MAG 46 with subscriber profiles keyed to MDN, as indicated by step 100. Preferably, the subscriber profiles include the profiles of all subscribers who are authorized to use MAG 46. A subscriber profile for a given MDN may specify what particular services, such as Web browsing, e-mail, instant messaging, or other packet-based services, the given MDN is authorized to use and under what conditions. A subscriber profile for a given MDN may also specify certain preferences to use when providing such services.

Although for purposes of simplicity step 100 is shown as a single step in the flow chart of FIG. 2, MAG 46 may be provided with subscriber profiles keyed to MDN on many different occasions. In particular, because the subscribers that use MAG 46 may change and the services the subscribers subscribe to may change, the subscriber profiles provided to MAG 46 may be updated periodically. In addition, the process of providing MAG 46 with subscriber profiles may involve storing information in MAG 46, or it may involve storing information in another location accessible by MAG 46. In this way, when MAG 46 identifies a particular MDN, MAG 46 can access the subscriber profile for that MDN to determine what services the particular MDN is authorized for.

MAG 46 is also provided with correlations between the MDNs of the subscriber profiles and the corresponding MSIDs, as indicated by step 102. In many cases, the mobile stations that are authorized to use MAG 46 will each have a unique have a MDN and a unique MSID. In such cases, MAG 46 will be able to uniquely determine MDN, given MSID, and will also be able to uniquely determine MSID, given MDN, from the correlations provided in step 102.

However, in other cases, more than one mobile station, each with a unique MSID, may use a given MDN. In such cases, MAG 46 will be able to uniquely determine MDN, given MSID, from the correlations provided in step 102, but MAG 46 will not be able to uniquely determine MSID, given MDN. MAG 46 may, however, be able to uniquely determine MSID, given MDN, from the correlations provided in step 102 in combination with other information.

In still other cases, a given mobile station that has a single MSID may be able to use more than MDN. In such cases, MAG 46 will be able to uniquely determine MSID, given MDN, from the correlations provided in step 102, but MAG 46 will not be able to uniquely determine MDN, given MSID. Nonetheless, MAG 46 may be able to uniquely determine MDN, given MSID, from the correlations provided in step 102 in combination with other information.

Although for purposes of simplicity step 102 is shown as a single step in the flow chart of FIG. 2, MAG 46 may be provided with correlations between MDNs and MSIDs on many different occasions. In particular, the correlations provided to MAG 46 may be updated periodically because, for example, subscribers may change the particular mobile stations, and, thus, MSIDs, that they use. In addition, the process of providing MAG 46 with correlations between MDNs and MSIDs may involve storing information in MAG 46, or it may involve storing information in another location accessible by MAG 46.

Figure 3:
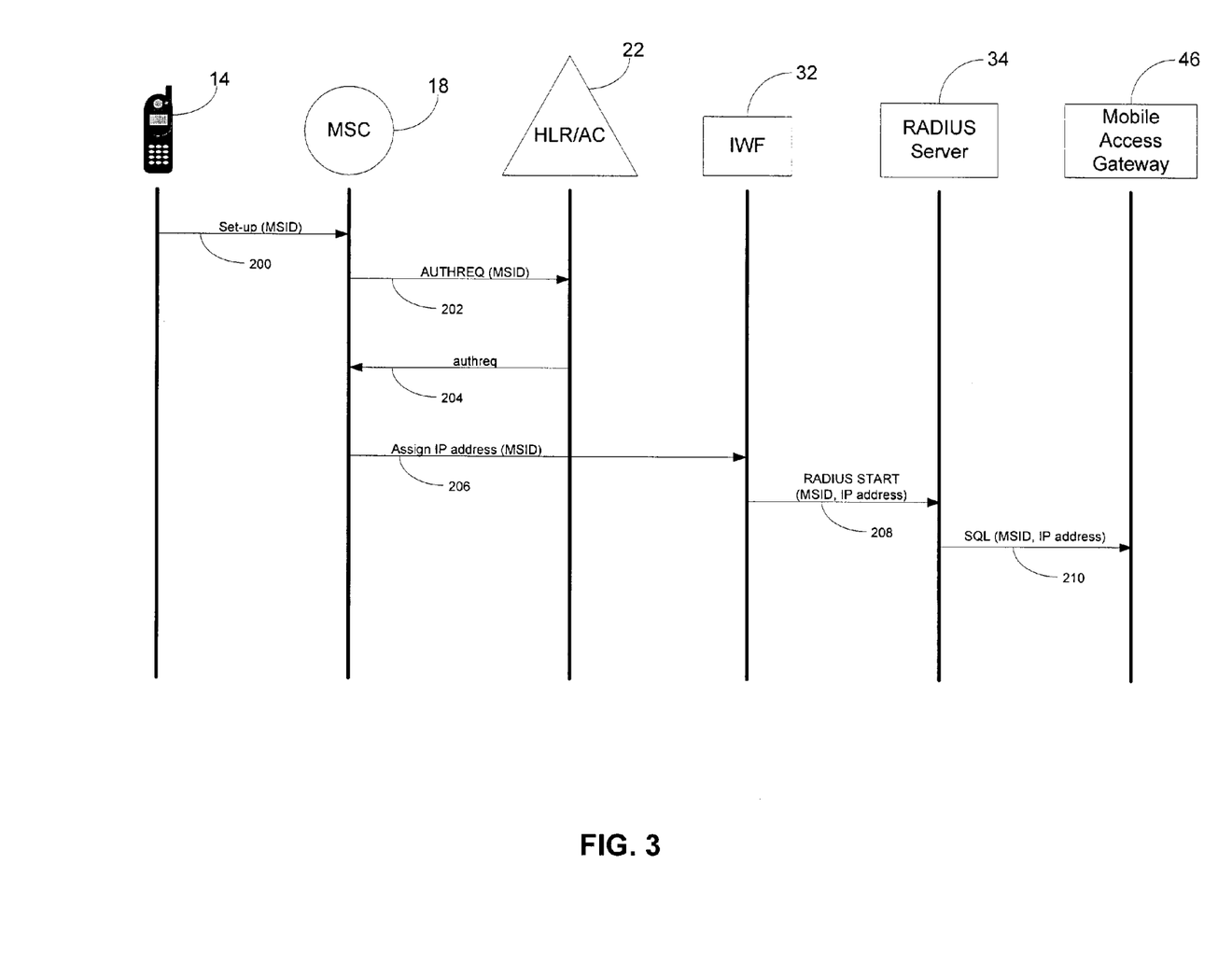
FIG. 3 is a simplified call flow diagram illustrating some of the signaling involved in the method of operation of FIG. 2.

With MAG 46 being able to access subscriber profiles keyed to MDN and correlations between MDNs and MSIDs, MAG 46 is able to identify mobile stations from their IP addresses, as described below. At step 104, a particular mobile station, e.g., mobile station 14, is assigned an IP address. The IP address may, for example, be dynamically assigned by a network access server, such as IWF 32. MAG 46 is then provided with a correlation between the mobile station's MSID and IP address, as indicated by step 106. As a result, MAG 46 will be able to determine the mobile station's MSID, given its IP address. FIG. 3, described in more detail below, provides additional details regarding how, in an exemplary approach, steps 104 and 106 may be implemented in wireless telecommunications network 10.

At step 108, MAG 46 receives a communication that includes the IP address of mobile station 14, which was assigned in step 104. The communication may originate from mobile station 14, in which case the source address of the communication may correspond to the IP address of mobile station 14. Alternatively, mobile station 14 may be the destination of the communication, in which case the destination address of the communication may correspond to the IP address of mobile station 14. In other cases, the communication may be sent by another network element on behalf of mobile station 14, in which case the IP address of mobile station 14 may be included in some other field. In addition to IP address, the communication may also include the MSID and/or MDN or mobile station 14.

The communication of step 108 may request access to one or more packet-based services. For example, the communication may request access to Web content server(s) 36. Thus, the communication may include an HDTP or HTTP request from the mobile station's Web browser and may identify a resource, such as by a Uniform Resource Locator (URL). In other cases, the communication of step 108 may request access to other services or resources. For example, the communication may request access to e-mail server 38 to check e-mail or to send e-mail. The communication may request access to message server(s) 40 for SMS messaging or instant messaging. The communication may request access to other applications 44, for example, to download ringers or games or to contact on-line customer service. In still other cases, the communication may simply request to be "logged in" to MAG 46. Once logged in to MAG 46, the mobile station may be able to receive indications of new e-mail messages, messages from message server(s) 40, alerts from alert server(s) 42, and/or other communications, via MAG 46, as described in more detail below.

As indicated by step 110, MAG 46 then determines the mobile station's MDN from the IP address included in the communication of step 108. MAG 46 may make this determination using the correlations provided in steps 102 and 106. For example, MAG 46 may use the correlation between MSID and IP address, provided in step 106, to determine the mobile station's MSID from the IP address included in the communication of step 108. MAG 46 may then use the correlations between MDNs and MSIDs, provided in step 102, to determine the mobile station's MDN from its MSID. Alternatively, MAG 46 may combine the correlations of steps 106 and 108 to create a single correlation, for example, between IP address, MSID, and MDN or between IP address and MDN directly.

In this way, MAG 46 can identify a mobile station or a subscriber associated with the communication of step 108 from the IP address included in the communication. For example, MAG 46 may identify a source of the communication on the basis of MDN, as in the example illustrated in FIG. 2. The "source" that MAG 46 identifies may correspond to a device, i.e., to a particular mobile station, or to a subscriber, i.e., to a particular mobile station user. Alternatively, from the IP address included in the communication of step 108, MAG 46 may identify the mobile station that is the destination of the communication, or MAG 46 may identify some other mobile station related to the communication.

Once MAG 46 determines the mobile station's MDN, MAG 46 may then validate the communication by consulting the subscriber profile for that MDN, as indicated by step 112. Thus, MAG 46 may determine from the subscriber profile whether the subscriber for that MDN is authorized to use MAG 46. In addition, if the communication of step 108 requests access to a particular service, such as Web browsing, e-mail, instant messaging, etc., MAG 46 may determined from the subscriber profile whether the subscriber for the MDN is authorized to use the requested service. MAG 46 may also perform other validation functions. For example, if the communication of step 108 includes an MDN or MSID, MAG 46 may also authenticate the communication by matching the MDN or MSID from the communication with the MDN or MSID determined from the mobile station's IP address.

Upon successful validation, MAG 46 grants the access requested by the communication of step 108. Thus, if the communication is, for example, an HDTP request with a URL, MAG 46 may send an HTTP GET request to one of Web content server(s) 36 corresponding to the URL. In response, the Web content server may send MAG 46 the content associated with that URL. MAG 46 may, in turn, send the content to the mobile station in response to the mobile station's HDTP or HTTP request. MAG 46 may also tailor the content it sends to the mobile station and/or the request MAG 46 sends on behalf of the mobile station, based on the subscriber profile associated for the mobile station's MDN. If the communication requests access to the subscriber's e-mail, the MAG may, upon successful validation, grant the subscriber access to e-mail server 38. Similarly, if the communication is trying to send an SMS or instant message or to contact on-line customer service, then, upon successful validation, MAG 46 may allow the message to go through to message server(s) 40. If the communication requests access to other applications 44, such as on-line customer service, then MAG 46 grants access upon successful validation.

MAG 46 may also perform other functions upon successful validation of the communication. For example, MAG 46 may forward the mobile station's MDN to other network elements, such as e-mail server 38, message server(s) 40, and/or alert server(s) 42, to notify them that the mobile station with that MDN is online and can be reached through MAG 46. MAG 46 may perform this function even if the communication of step 108 does not request access to a specific service. For example, the communication from the mobile station may simply serve to "log in" to MAG 46.

With the communication of step 108 successfully validated, other network elements may send indications, messages, alerts, or other communications to MAG 46, addressed to the mobile station's MDN. When MAG 46 receives such a communication, MAG 46 may use the correlations provided in steps 102 and 106 to determine the MSID and IP address corresponding to that MDN. MAG 46 then forwards the communication to the mobile station's IP address, via packet-switched network 30.

FIG. 3 is a simplified call flow diagram illustrating some of the signaling involved in assigning an IP address to the mobile station (step 104 in FIG. 2) and providing MAG 46 with a correlation between the mobile station's MSID and IP address (step 106 in FIG. 2). To initiate a session with packet-switched network 30, mobile station 14 may transmit a set-up message, as indicated by step 200. The set-up message identifies mobile station 14 by its MSID and includes other information to authenticate itself for radio resources, i.e., to receive a wireless traffic channel. In response, MSC 18 sends HLR/AC 22 an IS-41 AUTHREQ message, as indicated by step 202. The AUTHREQ message includes the MSID and authentication information. HLR/AC 22 receives the AUTHREQ message and authenticates the request for radio resources. HLR/AC 22 then sends MSC 18 the results of the authentication determination in an IS-41 authreq return result, as indicated by step 204. If authentication was successful, MSC 18 sends a message to IWF 32 instructing it to dynamically assign an IP address to mobile station 14, as indicated by step 206. The message of step 206 includes the MSID and may also include other information from mobile station 14.

After IWF 32 receives the message of step 206, IWF 32 may assign an IP address to mobile station 14 without further authentication. Alternatively, IWF 32 may conduct a further authentication step before assigning the IP address. For example, IWF 32 may forward a password and/or other information obtained from mobile station 14 to another network element, such as RADIUS server 34, and wait for an appropriate response before assigning an IP address to mobile station 14.

Once IWF 32 assigns an IP address to mobile station 14, IWF 32 establishes a correlation between this IP address and the MSID of mobile station 14 and communicates this correlation to MAG 46. IWF 32 may communicate this correlation to MAG 46 in various ways. For example, IWF 32 may communicate with MAG 46 directly. Alternatively, IWF 32 may communicate with MAG 46 via an intermediate node. For example, IWF 32 may communicate with RADIUS server 34, which may serve a plurality of IWFs. In that case, to provide MAG 46 with the correlation between IP address and MSID, IWF 32 may transmit a RADIUS accounting START message to RADIUS server 34, as indicated by step 208. The START message includes the IP address and the MSID of mobile station 14. RADIUS server 34 then sends a structured query language (SQL) instruction to MAG 46, as indicated by step 210. The SQL instruction includes the IP address and MSID and instructs MAG 46 to correlate them together.

As a result, MAG 46 will be able to determine the MSID corresponding to the IP address included in a subsequent communication from mobile station 14. Given an earlier-provided correlation between MSIDs and MDNs, MAG 46 can then determine the MDN of mobile station 14 for validation or other purposes.

3. CONCLUSION

Exemplary embodiments of the present invention have been described above. Those skilled in the art will understand, however, that changes and modifications may be made to these embodiments without departing from the true scope and spirit of the invention, which is defined by the claims.

What is claimed is:

1. A method of identification for communication between a mobile station and a packet-switched network, said packet-switched network including a gateway, said mobile station having a first identifier and a second identifier, wherein a subscriber profile is keyed to said second identifier, said method comprising:

provid­ing a first correlation between said first identifier and said second identifier;

assigning a network address to said mobile station;

providing a second correlation between said network address and said first identifier;

said gateway receiving a message from said mobile station, said message identifying a resource and including said network address;

said gateway determining that said second identifier identifies a source of said message based, at least in part, on said network address and said first and second correlations;

said gateway accessing said subscriber profile keyed to said second identifier; and said gateway determining whether to grant said mobile station access to said resource, based, at least in part, on said subscriber profile.

2. The method of claim 1, wherein said first identifier is a device identifier.

3. The method of claim 2, wherein said device identification is a mobile station identifier (MSID).

4. The method of claim 1, wherein said second identifier is a directory number.

5. The method of claim 4, wherein said directory number is a mobile directory number (MDN).

6. The method of claim 1, wherein said network address is an Internet Protocol (IP) address.

7. The method of claim 1, further comprising:
a network access server receiving a set-up message from said mobile station, said set-up message including said first identifier; and
in response to said set-up message, said network access server dynamically assigning said network address to said mobile station.

8. The method of claim 7, wherein said network access server is an interworking function (IWF).

9. The method of claim 7, wherein providing a second correlation between said network address and said first identifier comprises:
transmitting a correlation message to said gateway, said correlation message including said network address and said first identifier.

10. The method of claim 7, wherein providing a second correlation between said network address and said first identifier comprises:
said network access server transmitting a first correlation message to an intermediate node of said packet-switched network, said first correlation message including said network address and said first identifier; and
said intermediate node transmitting a second correlation message to said gateway, said second correlation message including said network address and said first identifier.

11. The method of claim 10, wherein said intermediate node is an accounting server.

12. The method of claim 1, wherein said resource corresponds to a content server.

13. The method of claim 12, wherein said message from said mobile station requests content associated with said resource.

14. The method of claim 13, further comprising:
if said gateway has determined to grant said mobile station access to said resource, said gateway sending a request to said content server, said request identifying said resource;
said gateway receiving a response from said content server, said response including said content associated with said resource; and
said gateway sending said content to said mobile station.

15. The method of claim 14, further comprising:
said gateway tailoring said content based on said subscriber profile.

16. A method of identifying a mobile station, said mobile station having a first identifier and a second identifier, wherein a subscriber profile is keyed to said second identifier, said method comprising:
assigning a third identifier to said mobile station;
providing at least one correlation between said first, second, and third identifiers;
a gateway receiving a message that includes said third identifier, said message requesting access to a resource;
said gateway identifying said second identifier of said mobile station as being associated with said message based, at least in part, on said third identifier and said at least one correlation;
said gateway accessing said subscriber profile keyed to said second identifier; and
said gateway determining whether to grant said mobile station access to said resource, based, at least in part, on said subscriber profile.

17. The method of claim 16, wherein said first identifier is a mobile station identifier (MSID).

18. The method of claim 16, wherein said second identifier is a mobile directory number (MDN).

19. The method of claim 16, wherein said third identifier is a network address.

20. The method of claim 16, wherein providing at least one correlation between said first, second, and third identifiers comprises:
providing a first correlation between said first and second identifiers; and
providing a second correlation between said first and third identifiers in response to a correlation message from an accounting server, said correlation message including said first and third identifiers.

21. A system comprising:
a network access server for providing a mobile station access to a network, said mobile station having a first identifier and a second identifier, assigning a network address to said mobile station, and establishing a first correlation between said first identifier and said network address;
a gateway, said gateway having access to a second correlation between said first identifier and said second identifier, said gateway being able to identify a source of at least one communication related to said mobile station using said first and second correlations; and
an accounting server, communicatively coupled to said network access server and said gateway, for receiving a first correlation message from said network access server, said first correlation message including said first identifier and said network address, and for responsively transmitting a second correlation message to said gateway, said second correlation message including said first identifier and said network address.

22. The system of claim 21, wherein said gateway is a proxy server.

23. The system of claim 21, wherein said at least one communication identifies a resource and requests content associated with said resource.

24. The system of claim 23, wherein said gateway determines whether to grant said mobile station access to said resource, based, at least in part, on said source identified by said gateway.

25. The system of claim 24, wherein, if said gateway has determined to grant said mobile station access to said resource, said gateway:
(a) sends a request to a content server, said request identifying said resource;
(b) receives a response from said content server, said response including said content associated with said resource; and
(c) sends said content to said mobile station.

26. The system of claim 25, wherein said gateway has access to a profile associated with said second identifier and is able to tailor said content based on said profile.

27. The method of claim 16, wherein assigning a third identifier to said mobile station comprises:
dynamically assigning said network address to said mobile station in response to a set-up message from said mobile station, said set-up message including said first identifier.

* * * * *

UNITED STATES PATENT AND TRADEMARK OFFICE
CERTIFICATE OF CORRECTION

| | |
|---|---|
| PATENT NO. | : 7,616,647 B1 |
| APPLICATION NO. | : 10/386316 |
| DATED | : November 10, 2009 |
| INVENTOR(S) | : Madhavarapu et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2009 days.

Signed and Sealed this

Nineteenth Day of October, 2010

David J. Kappos
*Director of the United States Patent and Trademark Office*